Jan. 5, 1937. J. Y. BLAZEK ET AL 2,066,389
TOOL SETTING MEANS
Filed Dec. 29, 1933
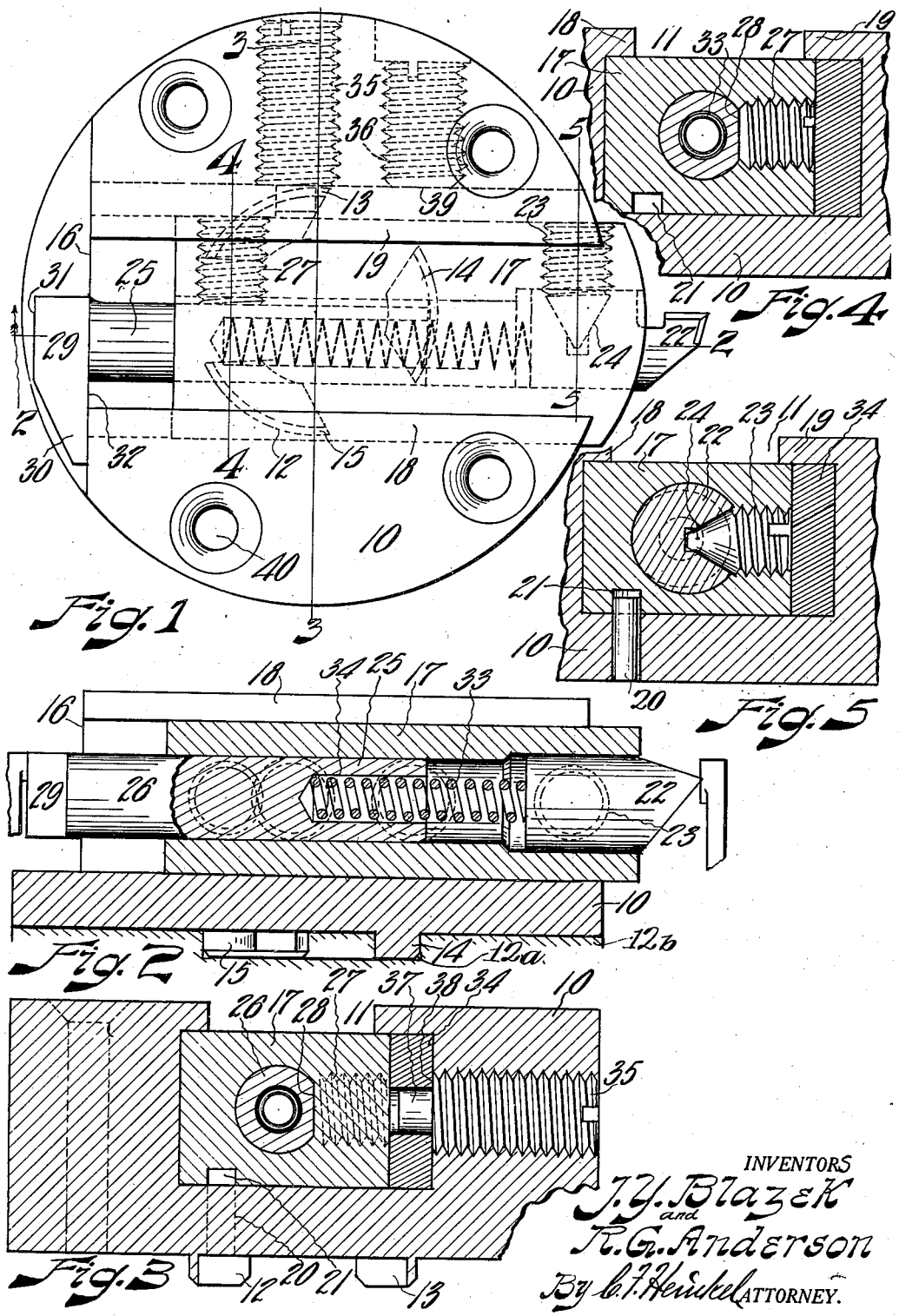
INVENTORS
J.Y. Blazek
and
R.G. Anderson
By C.F. Henkel ATTORNEY.

Patented Jan. 5, 1937

2,066,389

UNITED STATES PATENT OFFICE 2,066,389

TOOL SETTING MEANS

John Y. Blazek, Maple Heights, and Russell G. Anderson, Cleveland, Ohio, assignors to Lempco Products, Inc., Bedford, Ohio Application December 29, 1933, Serial No. 704,438

1 Claim. (Cl. 77—58)

The present invention relates to improvements in means for setting tools.

Objects of the present invention are to provide a means whereby the cutting point of a tool can be set to a definite predetermined position so that the same may machine a surface to a predetermined dimension; which is simple of structure and easy and convenient and positive and efficient of operation; wherein a tool bit can be used; which can be applied or incorporated in tool heads of different kinds and of different machines; which has an efficiently acting pilot for locating the same on a carrying member therefor; wherein a tool setting can not easily be tampered with; wherein a tool setting is effected by a spring in contrast to setting by human effort; wherein a tool carriage has a tool secured thereto and is adjustable in a tool carrying body for adjusting and setting of the tool; wherein a cutting tool can be adjusted or set to machine a surface to a predetermined size before it is put into a machine for machining thereby; and wherein a stop or abutting means locates the machining tool positively in a machining device to machine a surface to a predetermined size.

Other objects will be pointed out in this specification or will become obvious and apparent or will suggest themselves upon an inspection of this application and the accompanying drawing.

The present invention is carried out in one manner in the embodiment shown in the accompanying drawing for purposes of illustration but not for limitation of the present invention and, in which drawing, similar reference characters refer to similar parts throughout the views and in which:

Fig. 1 is a bottom plan view of a tool head embodying the present invention.

Fig. 2 is a section taken on the line 2—2 of Fig. 1.

Fig. 3 is a section taken on the line 3—3 of Fig. 1.

Fig. 4 is a fragmental section taken on the line 4—4 of Fig. 1.

Fig. 5 is a fragmental section taken on the line 5—5 of Fig. 1.

The body or head 10 has the open top and open ended slot 11 transversely through the same for purposes appearing herein below. The pilot means 12 projects from one end face of the body, fits laterally into the pilot hole 12a in supporting means or member 12b and is shown as being composed of three parts 13, 14 and 15 although any other number of parts may be used, preferably an uneven number. The parts are arranged so that portions thereof are diametrically opposite so that a measuring instrument can be applied, diametrically thereover, for correct diametrical measurement thereof so that the same can be made to fit correctly into a pilot opening of a bar to which the body 10 and the tool setting means is applied for centralization or desired locative relation of the body on the bar.

The part structure of the pilot, as compared to or with a pilot having a continuous piloting surface, affords a more accurate and a more positive relating means of the tool head in that the fit between the pilot and the bar can thereby be made more closely. The spaces between the parts provide a means to let air escape from the pilot receiving recess in the head receiving bar during insertion of the pilot into the bar.

The face 16 is provided on one side of the body and, preferably, is parallel in plane with the longitudinal axis of the body and at right angles to or with the axis of the slot 11 and is spaced a predetermined distance from the longitudinal axis of the body.

The carriage 17 fits slidingly into the slot 11 to move axially therein and is retained in the body by means of the projections 18 and 19 respectively engaging the top surface of the carriage to retain the same in the body.

The surface of the carriage between the projections 18 and 19 is exposed so that a tool or other element may be secured thereto when desired or necessary or convenient to perform machining other or in addition to machining performed by the tool bit mentioned herein below, or so that means other than tool means may be secured thereto to operate in conjunction with the tool bit or in conjunction therewith.

The pin 20 is driven into the bottom of the body and an end thereof projects into the slot 11 therein. The groove 21 is provided in the carriage, throughout its length to engage the projecting end of the pin 20 for guidance of the carriage relative to the body.

The tool bit 22 is mounted in one end of the carriage in such a position or location to bring the cutting point thereof slightly in advance of a radial axis of the body for smooth cutting by the tool bit. The tool bit may be made of any suitable material appropriate to or for work to be done by the same. For many or for general purposes, especially for such purposes as reboring cylinders, it is preferred that the tool bit be made of very hard material so that the same will not wear down appreciably during its cutting travel through the cylinder so as to bore the cylinder with a straight hole therethrough. It has been found that material suitable for this purpose are cemented carbides or sintered carbides.

The bit holding screw 23 is tapped into the carriage and has the conical point 24 to engage in a corresponding countersink in the tool bit and thereby positively holds the same in axial relation with the carriage and prevents rotation thereof.

The setting plug 25 has the stem or shank 26, cross-sectionally round in the present instance, and is slidable axially in the other end of the carriage for adjusting the same relative to the carriage. The set or locking screw 27 is tapped into the carriage to abut the flattened face 28 on the stem 26 for locking the plug in an adjusted position relative to the carriage.

The plug also has the rectangular head 29, of a predetermined thickness, adjacent to the stem. The part 30 of the head extends from the stem sufficiently far to abut the surface or face 16 and is tapered to form an approach for a measuring or tool setting instrument or means to the outer surface 31 of the head for convenience of applying such an instrument or means thereto and being spring pressed against this instrument.

The underside 32 of the head 29 abuts the face 16 and the outer face or surface 31 thereof is parallel therewith.

The spring 33 is confined in the hole 34 axially of the stem 26 and one end of the spring abuts the bottom of the hole 34 and the other end thereof abuts the tool bit.

The object of the spring 33 is to provide a resilient means between the carriage and the stem which means normally tends to move the tool bit in the carriage in a longitudinally separate relation.

The filler strip or gib 34 is interposed between one wall of the slot 11 and one side of the carriage and is held in position longitudinally and clamped against the side of the carriage by means of the screws 35 and 36 threaded into the body as shown. The screw 35 has the pilot 37 thereon to engage a corresponding hole in the strip and thereby retain the strip longitudinally in the body and also has the shoulder 38 adjacent to the pilot to engage the strip to clamp the same against the carriage.

The screw 36 has no pilot although one could be provided thereon similar to the screw 35, and the end 39 thereof abuts the strip to clamp the same against the carriage. The object of the screws 35 and 36 is to frictionally lock the carriage against a side of the slot 11 and to release this frictional locking sufficient so that the carriage can move in the slot with any desired friction.

When the device is assembled, the tool bit is held in the carriage by the screw 23; the carriage is held in the body by the screws 35 and 36; the plug is held to the carriage by the screw 27; the head 29 abuts the body; the body is centralized on a supporting means by the pilot 12 and is secured to the supporting means.

The head or body 10 is secured to a boring bar or other supporting structure by means of screws extending through the holes 40 through the body.

The carriage and tool bit and plug therein are adjusted while this mechanism is out of the body which is done by first releasing the screw 27 so that the carriage and the plug can move axially relatively. A measuring or tool setting instrument or gage or other suitable means, set to a dimension suitable for the tool adjustment or setting is facilitated in this application by the tapered face on the head 29. Normally, the spring 33 extends the carriage and the plug axially. When a measuring or tool setting instrument is present, relative to the head 29 and the cutting end of the tool bit, the carriage and the head are first contracted relatively against the action of the spring 33 to a dimension or distance which is less than the distance between the measuring or gaging surfaces of the measuring or tool setting means. The measuring or tool setting means is then applied so that one measuring or gaging surface thereof is opposite the face 31 while the other measuring or gaging surface thereof is opposite the cutting end of the bit.

When the contracting pressure on the carriage and plug is released, the carriage and the plug are expanded by the spring 33 until the face 31 contacts one of the measuring or gaging surfaces of the instrument or gaging means and the cutting end of the tool bit contacts the other. The spring is practically under constant compression so that the contacting faces will always engage with practically the same pressure and the human element of proclivity to effect this engaging contact with different pressures, with consequent irregular adjustment or setting of the tool, is thereby effectively eliminated.

When the respective surfaces are so moved into contact by the spring, the screw 27 is tightened and the tool is thereby effectively set to a definite predetermined relation to the longitudinal axis of the body. The screw 27 is blind after the carriage mechanism is inserted into the body so that no alteration can be made in the setting of the tool bit after the mechanism is installed in the body.

When the mechanism is so adjusted or set in the carriage, the carriage as a whole is inserted into the body endwise through the slot 11 therein until the underside 32 of the head 29 abuts the face or surface 16 on the body 10 whereupon the screws 35 and 36 are tightened against the filler strip 34 to clamp the carriage to the body with the face 32 abutting on the face 16.

By this means, the carriage mechanism is adjusted individually and effectively locked against movement of parts thereof while the same is out of the body and the insertion of the carriage means is limited by the face 32 abutting the face 16 so that the adjustment of the carriage mechanism is not affected by the insertion thereof into the body and will always be inserted into the body to a correct, predetermined relation to the longitudinal axis of the head.

The distance of the face 16 from the longitudinal axis of the body is predetermined and the thickness of the head 29 is also predetermined. Therefore, a measuring or gaging device must be set to a distance between the contacting surfaces thereof corresponding to the radius of the bore to be made, plus the distance of the face 16 from the longitudinal axis of the body, plus the thickness of the head 29. This calculation of the distance for the measuring or gaging instrument is simplified by the predetermined distance of the face 16 from the longitudinal axis of the body and by the predetermined thickness of the head 29.

The mechanism shown and described provides an easy and convenient and accurate means for adjusting or setting a tool to machine a surface to a predetermined size, the mechanism is adjusted or set before it is inserted into a machining body and can not easily be tampered with after it is inserted into the body.

Applicants are aware that the present invention can be applied to tool setting means other than the application specifically shown and described herein and that changes and modifications and rearrangements may be made therein within the scope and spirit and intent of the present invention and the claim appended to this specification.

Therefore, applicants do not limit the present invention to the specific application thereof as precisely shown and described herein nor to the precise structure and arrangement of parts and elements as shown and described herein.

Having thus fully described the present invention, we claim:

The combination of a boring head having a flat face on a side thereof and a slot transversely of said head at right angles to said flat face with a tool setting means including a carriage longitudinally movable in said slot, a gib between a side wall of said slot and a side of said carriage, a screw threaded into said head and having a diametrically reduced pilot on the inner end thereof to engage in a hole in said gib to prevent longitudinal movement of said gib relative to said head and to form an abutment shoulder to clamp said gib against said carriage and said carriage against the other side of said slot, a tool bit secured to one end of said carriage, a setting plug having one end thereof axially telescoped into the other end of said carriage and lockable therein against axial movement, an abutment head on the other end of said plug to abut said flat face, a spring in said carriage and having one end thereof in abutment on the inner end of said tool bit and the other end thereof in abutment on the inner end of said setting plug to move said tool bit and said abutment head against corresponding parts of a measuring instrument, and means for locking said setting plug against movement when the same is set.

JOHN Y. BLAZEK.
RUSSELL G. ANDERSON.